United States Patent Office 3,358,008
Patented Dec. 12, 1967

3,358,008
DI(ALUMINOALKYL)CYCLOPENTANE POLYMERS AND THEIR PREPARATION
Erich Marcus, Charleston, and Donald L. MacPeek, South Charleston, W. Va., assignors to Union Carbide Corporation, a corporation of New York
No Drawing. Filed Dec. 28, 1962, Ser. No. 247,828
8 Claims. (Cl. 260—448)

The present invention is concerned with a novel process for the production of dialiphatic-substituted cyclopentanes, including polymeric organoaluminum compounds, utilizing 1,5-cyclooctadiene and an isoalkylaluminum as initial reactants. The invention is also concerned with certain of the dialiphatic-substituted cyclopentanes, particularly the polymeric organoaluminum compounds and the higher molecular weight dienes, mono- and diepoxides, and diols hereinbelow described as novel and useful compositions of matter. In addition, the invention provides for the production of novel monoaliphatic substituted cyclooctenes, including alkenyl- and hydroxyalkyl-substituted cyclooctenes as well as the corresponding alkenyl- and epoxyalkyl-substituted epoxycyclooctanes.

In accordance with this invention, 1,5-cyclooctadiene is initially reacted with an isoalkylaluminum so as to form a novel polymer composed of recurring 1-aluminomethyl-2-aluminoethylcyclopentane units. This reaction can be represented by the partial equation:

I

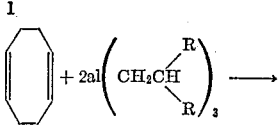

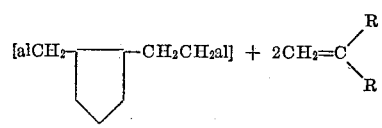

wherein each R, independently, designates an alkyl radical preferably containing from 1 to 4 carbon atoms.

It is to be noted that, as herein employed, the symbol "al" designates one-third of an atom of aluminum. Thus, in all instances, each aluminum atom is attached to three other atoms. In addition, it is to be noted that the 1-aluminomethyl - 2 - aluminoethylcyclopentane-containing polymer is also composed of terminal aluminocyclooctene units of the formula:

II

Minor amounts of other recurring and terminal units may also be present.

The isoalkylaluminums which can be reacted with 1,5-cyclooctadiene as contemplated by this invention are the triisoalkylaluminums and diisoalkylaluminum hydrides represented by the formulas:

III

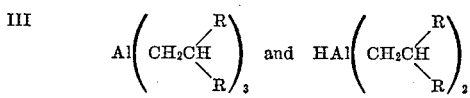

wherein R is as defined above. Suitable isoalkylaluminums include, by way of illustration, triisobutylaluminum, tri-2-methylbutylaluminum, tri-2-ethylhexylaluminum, diisobutylaluminum hydride, di-2-methylbutylaluminum hydride, di-2-ethylhexyl aluminum hydride, and the like.

The preferred isoalkylaluminum is triisobutylaluminum. Isoalkylaluminums containing two or three different isoalkyl radicals can also be employed as a reactant.

In producing the 1-aluminomethyl-2-aluminoethylcyclopentane-containing polymer in accordance with this invention, the proportion of 1,5-cyclooctadiene to isoalkylaluminum can vary broadly. Preferably, a proportion of from about 1 to about 5 moles of 1,5-cyclooctadiene per mole of isoalkylaluminum is charged, although proportions outside this range can also be employed. In addition, when desired, an inert organic solvent can be incorporated in the reaction mixture. Suitable solvents include, for instance, heptane, octane, decane, benzene, toluene, xylene, decalin and the like. Excess 1,5-cyclooctadiene also serves as a solvent.

The reaction temperature can vary broadly in the range of from about 80° C. to about 180° C., substantially lower temperatures engendering an excessively slow rate of reaction, while at higher temperatures, undesirable side reactions may occur. Preferably, a reaction temperature of from about 120° C. to about 160° C. is employed. At such temperatures, the reaction is generally carried out for a period of from about 1 to about 10 hours. However, longer or shorter reaction periods sufficient to produce the desired polymer can also be employed.

It has also been found preferable, during the course of the reaction, to remove the isoolefin formed as a by-product. Concordant therewith, the reaction can be carried out in an open system under atmospheric pressure, or in a closed system under autogenous pressure providing the system is equipped, in the latter instance, with means for venting or removing the by-product. The removal of by-product isoolefin serves to drive the reaction to completion and minimizes or eliminates side reactions between the isolefin and the growing polymer.

The polymer thus obtained is ordinarily liquid at room temperature, and can be recovered from the reaction mixture, in any convenient manner. For instance, the polymer can be recovered as the residue product obtained upon removal of the more volatile components of the reaction mixture by distillation or evaporation, etc.

In another aspect of this invention, when a polymer containing recurring di(aluminoalkyl)cyclopentane units of higher molecular weight, i.e. increased aluminoalkyl chain length, is desired, the polymer obtained as described above is subsequently subjected to a "growth" process by reaction with ethylene in the absence of a catalyst, and preferably under pressure. This reaction, can be represented by the partial equation:

IV

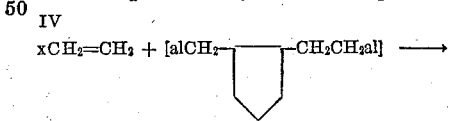

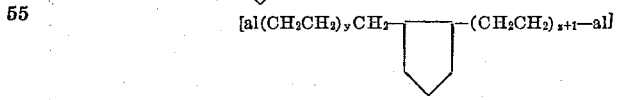

wherein y and z designate integers of from 0 to a positive value, at least one of which must be a positive value as a consequence of the reaction with ethylene; the sum of y plus z being equal to x, the number of moles of ethylene added per recurring unit of the polymer. Thus, in the "growth" process ethylene units are inserted between aluminum atoms and adjacent carbon atoms. A similar "growth" process will also occur in any minor amounts of other recurring units present in the polymer, as well as in terminal groups. Accordingly, the "grown" polymer will contain terminal aluminoalkylcyclooctene units of the formula:

V

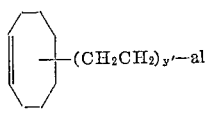$-(CH_2CH_2)_{y'}-al$ wherein $y'$ is a positive value within the meaning hereinabove defined by $y$. In addition, the "grown" polymer will contain a minor amount of recurring and terminal units which have not reacted with ethylene.

The amount of ethylene reacted should be sufficient to effect the "growth" of the recurring units of the polymer to the extent desired, as determined, for instance, by the subsequent use of the "grown" polymer. Useful polymers, by way of illustration, are those in which the aluminoalkyl

VII

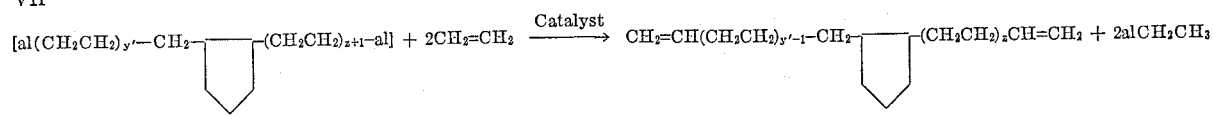

chain length of the recurring units have "grown" by a statistically varying length of from 2, and preferably from 6, to about 32 carbon atoms, i.e. wherein $y$ and $z$ designate integers having a value of from zero to about 8, at least one of which has a positive value, the sum of which is preferably a value of at least 3. To this end, the polymer for which "growth" is desired is reacted with ethylene in a proportion of at least 1.5 moles, and preferably from about 4.5 moles, to about 24 moles of ethylene per atom of aluminum present in the polymer or per mole of isoalkylaluminum initially reacted to produce the polymer. In practice, however, an excess over the required amount of ethylene is generally charged. If desired, an inert organic solvent such as those described in connection with the initial polymer formation can also be incorporated in the reaction mixture.

The reaction temperature for the "growth" process can vary broadly in the range of from about 80° C. to about 190° C., substantially lower temperatures engendering an excessively slow rate of reaction, while at higher temperatures, undesirable side reactions may occur. Preferably a reaction temperature of from about 85° C. to about 120° C. is employed, particularly in connection with a batch operation. At such temperatures, the reaction is generally carried out for a period of from about 5 to about 50 hours. However, longer or shorter reaction periods consistent with the production of the "grown" ploymer can also be employed. Thus, for instance, the reaction can also be carried out continuously in a tubular reactor at a temperature preferably of from about 120° C. to about 190° C. for very short contact periods. The amount of ethylene entering the polymer can be controlled in part by the control of temperature, reaction period, etc., and is readily determinable by one skilled in the art in light of this disclosure.

After the desired amount of ethylene has been incorporated in the polymer as determined for instance, by the moles of ethylene consumed, the system is vented so as to remove any excess ethylene. The "grown" polymer thus obtained, like its polymeric precursor, is ordinarily liquid at room temperature, and can be recovered from the reaction mixture in any convenient manner, as for instance, by the techniques described above in connection with the recovery of the ungrown polymer.

In still another aspect of the invention, the polymeric products hereinabove described are subjected to a "displacement" process by subsequent reaction with ethylene in the presence of a catalyst, and preferably under pressure, to form a useful class of dienes, viz. di(ω-alkenyl) cyclopentanes. In one embodiment of this aspect of the invention, when using an "ungrown" polymer, i.e. the polymer obtained in accordance with Equation I, the catalyzed reaction with ethylene can be represented by the partial equation:

VI

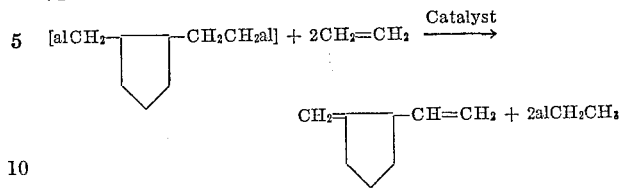

wherein the double bond of the methylene radical is attached to a single carbon atom of the cyclopentane nucleus. Similarly, the catalyzed reaction of ethylene with the "grown" polymer obtained in accordance with Equation IV can be represented by the partial equation:

wherein $y'$ and $z$ are as defined above. Alternatively, when the "grown" polymer is such that $y$ is zero, the catalyzed reaction with ethylene can be represented by the partial equation:

VIII

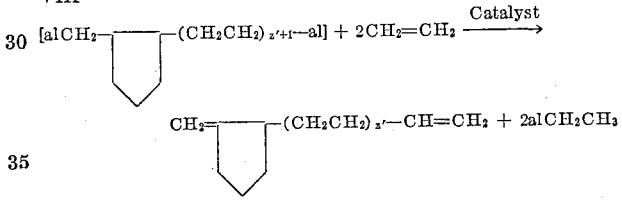

wherein the double bond of the methylene radical attached directly to the cyclopentane nucleus is attached to a single carbon atom thereof, and $z'$ is a positive value within the meaning hereinabove defined by $z$. A similar "displacement" process also occurs in any minor amounts of other recurring units present in the polymer as well as in terminal units. Thus, when the polymer undergoing reaction is an "ungrown" polymer, cyclooctadiene is simultaneously derived from the terminal aluminocyclooctene units of the polymer. Similarly, when the polymer undergoing reaction is a "grown" polymer, the terminal aluminoalkylcyclooctene units are converted to ω-alkenylcyclooctenes represented by the formula:

IX

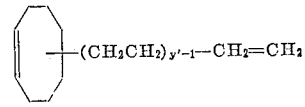$-(CH_2CH_2)_{y'-1}-CH_2=CH_2$ wherein $y'$ is as defined above.

In the "displacement" process, the polymer is reacted with ethylene in a proportion of at least 3 moles of ethylene per atom of aluminum present in the polymer. In practice, however, an excess over the required amount of ethylene is generally charged. If desired, an inert organic solvent such as those described above in connection with the initial polymer formation can also be incorporated in the reaction mixture. In addition, the presence of a small amount of an acetylenic compound, such as phenylacetylene, has been found to minimize the migration of double bonds in the diene product.

Suitable catalysts for use in the "displacement" process include nickel, cobalt, and platinum. Such metals can be incorporated in the reaction mixture in elemental form, or preferably, as an inorganic or organic salt, such as nickel chloride, platinum chloride, cobalt chloride, nickel acetylacetonate, platinum acetylacetonate, cobalt acetylacetonate, and the like. The use of such salts ordinarily engenders a better dispersion of the metal in the reaction mixture. The catalyst is generally employed in a concentration of from about 0.0001 to about 1 percent by weight of metal based upon the weight of the polymer undergoing reaction, although higher or lower catalytic amounts can also be used. Preferably, the catalyst is employed in a concentration of from about 0.005 to about 0.1 percent by weight based in like manner.

The reaction temperature for the "displacement" process can vary broadly in the range of from about 25° C. to about 120° C., particularly in connection with a batch operation. Here again substantially lower temperatures engender an excessively slow reaction rate, while at higher temperatures, in the presence of the catalyst, undesirable side reactions may occur. The preferred reaction temperature is from about 40° C. to about 70° C. At such temperatures the reaction is generally carried out for a period of from about 1 to about 24 hours. However, longer or shorter reaction periods consistent with diene formation can also be employed.

The displacement process can also be conducted omitting the use of a catalyst at substantially higher reaction temperatures of from about 250° C. to about 350° C. or slightly higher, and preferably from about 280° C. to about 320° C. At such higher temperatures, the reaction is best carried out continuously in a tubular reactor for short contact periods.

The diene product thus obtained is ordinarily liquid at room temperature and can be recovered from the reaction mixture in any convenient manner. For instance, the product can be recovered as the residue obtained upon removal of the more volatile components of the reaction mixture by distillation. Alternatively, the reaction mixture can be hydrolyzed to assist the removal of alkylaluminum formed as a by-product. Hydrolysis can be effected by reaction with water, aqueous alcohol, and/or dilute acid. Upon hydrolysis, aluminum hydroxide is formed. The diene product can then be recovered by distillation of the organic phase of the reaction mixture. The removal of by-product alkylaluminum in this manner prevents the reversal of the "displacement" process which might otherwise occur upon distillation of the diene product.

Due to the nature of the polymer employed as precursor, the diene product may comprise an isomeric mixture of 1,2-di(ω-alkenyl)cyclopentanes of statistically varying molecular weight (alkenyl chain length) in both trans and cis forms, the latter generally predominating in the product. In addition, cyclooctadiene and ω-alkenylcyclooctenes of statistically varying molecular weight are also produced. Such mixture can be resolved into components of narrow carbon content ranges by fractional distillation and the products analyzed by gas chromatography.

As typical of the di(ω-alkenyl)cyclopentanes produced in accordance with this invention, there can be mentioned:

1-methylene-2-vinylcyclopentane,
1-methylene-2-(3-butenyl)cyclopentane,
1-methylene-2-(5-hexenyl)cyclopentane,
1-methylene-2-(7-octenyl)cyclopentane,
1-methylene-2-(9-decenyl)cyclopentane,
1-(2-propenyl)-2-(3-butenyl)cyclopentane,
1-(2-propenyl)-2-(7-octenyl)cyclopentane,
1-(4-pentenyl)-2-(5-hexenyl)cyclopentane,
1-(4-pentenyl)-2-(9-decenyl)cyclopentane,
1-(4-pentenyl)-2-(17-octadecenyl)cyclopentane, and the like. Similarly, as typical of the ω-alkenylcyclooctenes produced in accordance with this invention, there can be mentioned 5-vinylcyclooctene, 5-(3-butenyl)cyclooctene, 5-(5-hexenyl)cyclooctene, 5-(7-octenyl)cyclooctene, 5-(15-hexadecenyl)cyclooctene, and the like. The higher molecular weight di(ω-alkenyl)cyclopentenes containing from 14 to about 40 carbon atoms and the ω-alkenylcyclooctenes are contemplated as novel compositions of matter.

The dienes can subsequently be polymerized in accordance with conventional processes for the polymerization of olefinically unsaturated compounds to produce useful polymers. The di(ω-alkenyl)cyclopentanes can also be reacted in accordance with conventional processes for the epoxidation of olefinically unsaturated compounds to produce the vicinal mono- and diepoxides represented by the formulas:

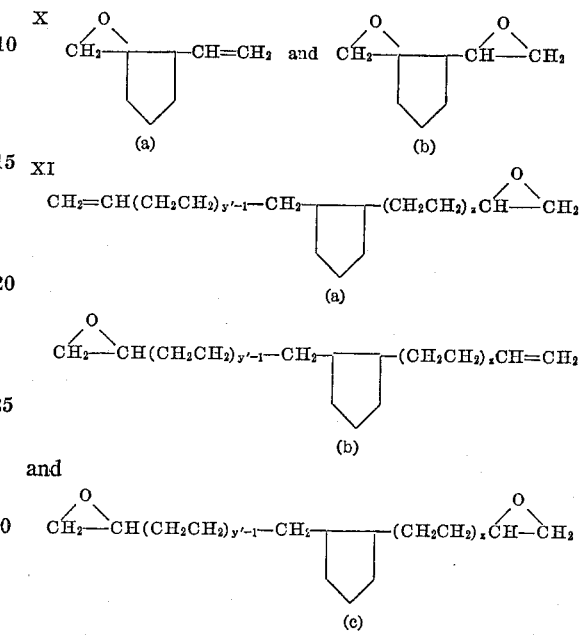

wherein $y'$ and $z$ are as defined above; and

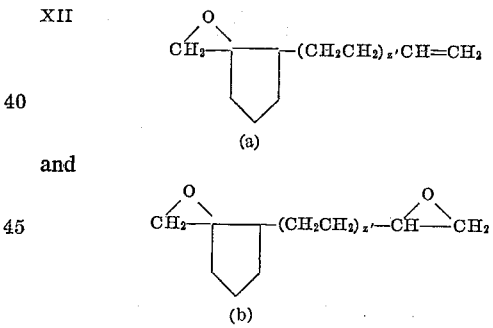

wherein $z'$ is as defined above. The specific structure of the epoxide product will depend upon the diene employed as a precursor. For instance, the epoxides represented by Formulas X(a) and (b) are derived from the di(ω-alkenyl)cyclopentanes obtained in accordance with Equation VI; the epoxides represented above by Formulas XI(a) to (c) are derived from the di(ω-alkenyl)cyclopentanes obtained in accordance with Equation VII; and the epoxides represented by Formulas XII(a) and (b) are derived from the di(ω-alkenyl)cyclopentanes obtained in accordance with Equation VIII. In similar manner, the ω-alkenylcyclooctenes produced in accordance with this invention are epoxidized to yield the vicinal mono- and diepoxides represented by the formula:

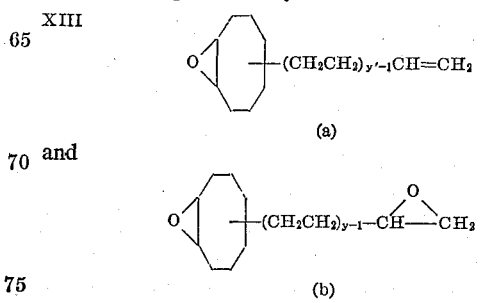

wherein $y'$ is as defined above, while vicinal epoxycyclooctenes and diepoxycyclooctanes are derived from the cyclooctadiene.

The formation of a mono- or diepoxide will depend for the most part upon the amount of epoxidizing agent employed, and is readily determinable by one skilled in the art in light of this disclosure. It is to be noted that the reaction of the di($\omega$-alkenyl)cyclopentanes obtained in accordance with Equations VI and VIII with an amount of epoxidizing agent sufficient to produce a monoepoxide will generally result in the epoxidation of the bare methylene radical attached to the cyclopentane nucleus rather than the higher $\omega$-alkenyl radical. Under similar conditions, the epoxidation of the $\omega$-alkenylcyclooctenes selectively epoxidizes the unsaturation in the cyclooctene nucleus. On the other hand, the reaction of the di($\omega$-alkenyl)cyclopentanes obtained in accordance with Equation VII with an amount of epoxidizing agent sufficient to produce a monoepoxide may result in the production of an isomeric mixture of the epoxides represented by Formulas XI(a) and (b). Mixtures of mono- and diepoxides may also be produced depending, for instance, upon the amount of epoxidizing agent employed.

The epoxidation of the dienes can be carried out by reaction with peracetic acid or other conventional epoxidizing agent, in a suitable solvent such as ethylacetate, if desired, and at a temperature which can vary broadly in the range of from about $-25°$ C. to about $150°$ C. Preferably, reaction temperatures of from about $10°$ C. to about $90°$ C. are employed. At such temperatures, a reaction period of from about 1 to about 10 hours is usually sufficient for a complete reaction. However, longer or shorter reaction periods consistent with epoxide formation can also be employed.

The epoxide product can then be recovered from the reaction mixture in any convenient manner. For instance, the epoxide product can be recovered as the residue obtained upon removal of the more volatile components of the reaction mixture by distillation or evaporation, and resolved, if desired, by further distillation when more than one epoxide is produced.

As typicals of the epoxides produced in accordance with this invention, there can be mentioned:

1-methyleneoxy-2-(1,2-epoxyethyl)cyclopentane
1-methyleneoxy-2-(3-butenyl)cyclopentane
1-methyleneoxy-2-(5,6-epoxyhexyl)cyclopentane
1-methyleneoxy-2-(7-octenyl)cyclopentane
1-methyleneoxy-2-(9,10-epoxydecyl)cyclopentane
1-(2,3-epoxypropyl)-2-(1,2-epoxyethyl)cyclopentane
1-(2-propenyl)-2-(3,4-epoxybutyl)cyclopentane
1-(4,5-epoxypentyl)-2-(5,6-epoxyhexyl)cyclopentane
1-(4-pentenyl)-2-(7,8-epoxyoctyl)cyclopentane
1-(2,3-epoxypropyl)-2-(3-butenyl)cyclopentane
1-(2,3-epoxypropyl)-2-(7-octenyl)cyclopentane
1-(2,3-epoxypropyl)-2-(9,10-epoxydecyl)cyclopentane
1-(4,5-epoxypropyl)-2-(17,18-epoxyoctadecyl)cyclopentane
1,2,5,6-diepoxycyclooctane
5-vinyl-1,2-epoxycyclooctane
5-(1,2-epoxyethyl)-1,2-epoxycyclooctane
5-(3-butenyl)-1,2-epoxycyclooctane
5-(3,4-epoxybutyl)-1,2-epoxycyclooctane
5-(7,8-epoxyoctyl)-1,2-epoxycyclooctane
5-(16,17-epoxyhexadecyl)-1,2-epoxycyclooctane and the like. The higher molecular weight epoxides of Formulas XI and XII containing from 14 to about 40 carbon atoms, and the epoxides of Formula XIII are contemplated as novel compositions of matter.

The epoxides produced in accordance with this invention can be homopolymerized or reacted with organic hardeners such as polycarboxylic acids or anhydrides, polyamines, or polyols to produce curable resins having a wide variety of uses, particularly as molded articles. The resins thus obtained from the novel epoxides of this invention, particularly the diepoxides, and especially those of Formulas XI and XII may be characterized by enhanced impact strength and thermal shock resistance. The novel diepoxides of this invention can also be employed as plasticizers for vinyl resins. The novel monoepoxides of this invention, on the other hand, can be copolymerized with conventional vinyl monomers to produce resins having enhanced heat and/or light stability.

In a further aspect of this invention, the polymers obtained in accordance with Equations I and IV are converted to a useful class of diols, viz. the di($\omega$-hydroxyalkyl)cyclopentanes represented by the formula:

XIV

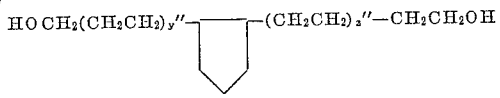

wherein $y''$ and $z''$ independently designate integers of from 0 to 8. The specific structure of the diols will depend upon the polymer employed as a precursor. Thus, the diols represented by Formula XIV wherein $y''$ and $z''$ each designate zero are derived from the polymer obtained in accordance with Equation I; while the diols represented by Formula XIV wherein "$y$" and/or "$z$" designate a positive integer are derived from the "grown" polymer obtained in accordance with Equation IV, with $y''$ and $z''$ being equal to $y$ and $z$ respectively. At the same time, the olefinically unsaturated monohydroxy compounds represented by the formula:

XV

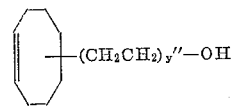

wherein $y''$ is as defined above, are derived from terminal units of the polymer.

The conversion of the polymer to mono- and diols can be carried out by contacting the polymer at a temperature maintained in the range of from about $0°$ C. to about $150°$ C., and preferably from about $30°$ C. to about $60°$ C., with oxygen so as to insert an oxygen atom between each aluminum atom of the polymer and the adjacent carbon atom. Such contact can be effected, for instance, by passing dry air or a nitrogen-oxygen mixture into a reaction mixture containing the polymer. Since the reaction is exothermic, it is desirable in some instances to use a low concentration of oxygen at the beginning of the reaction and thereafter increase the oxygen concentration in the reactant gas stream as the rate of reaction decreases. Near the end of the reaction, pure oxygen can be used to insure completion. If desired, in inert organic solvent such as those described above in connection with the initial polymer formation can also be incorporated in the reaction mixture.

After the oxygenation step, water or dilute acid is added to the reaction mixture to convert the oxygenated polymer to the mono- and diols. Water is preferred, as it readily hydrolyzes the polymer, forming the mono- and diols and aluminum hydroxide as a by-product. Alternatively, the oxygenated polymer can be hydrolyzed by reaction with aqueous alcohol.

The mono- and diols thus obtained can be recovered from the reaction mixture in any convenient manner, as for instance, by distillation of the organic phase of the reaction mixture, etc. Moreover, due to the nature of the polymers employed as precursors, the product may comprise an isomeric mixture of 1,2-di($\omega$-hydroxyalkyl)cyclopentanes of statistically varying molecular weight (hydroxyalkyl chain length) in both trans and cis forms, the latter generally predominating in the product. In addition, hydroxycyclooctene and $\omega$-hydroxyalkylcyclooctenes of statistically varying molecular weight are also produced. Such mixture can be resolved into components of narrow carbon content ranges by fractional distillation and the products analyzed by gas chromatography.

As typical of the di(ω-hydroxyalkyl)cyclopentanes produced in accordance with this invention, there can be mentioned:

1-hydroxymethyl-2-(2-hydroxyethyl)cyclopentane
1-hydroxymethyl-2-(4-hydroxybutyl)cyclopentane
1-hydroxymethyl-2-(6-hydroxyhexyl)cyclopentane
1-hydroxymethyl-2-(8-hydroxyoctyl)cyclopentane
1-hydroxymethyl-2-(10-hydroxydecyl)cyclopentane
1-(3-hydroxypropyl)-2-(2-hydroxyethyl)cyclopentane
1-(3-hydroxypropyl)-2-(4-hydroxybutyl)cyclopentane
1-(5-hydroxypentyl)-2-(6-hydroxyhexyl)cyclopentane
1-(5-hydroxypentyl)-2-(8-hydroxyoctyl)cyclopentane
1-(3-hydroxypropyl)-2-(10-hydroxydecyl)cyclopentane and the like. Similarly, as typical of the ω-hydroxyalkyl cyclooctenes produced in accordance with this invention, there can be mentioned: 5-(2-hydroxyethyl)cyclooctene, 5-(4-hydroxybutyl)cyclooctene, 5-(6-hydroxyhexyl)cyclooctene, 5-(8-hydroxyoctyl)cyclooctene, 5-(15-hydroxyhexadecyl)cyclooctene, and the like. The higher molecular weight di(ω-hydroxyalkyl)cyclopentanes containing from 14 to about 40 carbon atoms and the olefinically unsaturated monohydroxyalkyl compounds of Formula XV are contemplated as novel compositions of matter.

The diols produced in accordance with this invention can be employed as organic hardeners by reaction with diepoxides, such as 3,4-epoxy-6-methylcyclohexylmethyl, 3,4-epoxy-6-methylcyclohexanecarboxylate, in conventional manner to produce curable resins having a wide variety of uses, particularly as molded articles. The resins thus produced from the novel diols of this invention may be characterized by enhanced impact strength nad thermal shock resistance. The olefinically unsaturated monohydroxyalkyl compounds of Formula XV, on the other hand, can be employed as cross-linking agents for vinyl resins.

The polymers obtained in accordance with Equations I and IV can also be hydrolyzed by reaction with aqueous alcohol and/or dilute acid to form the dialkylcyclopentanes represented by the formula:

XVI

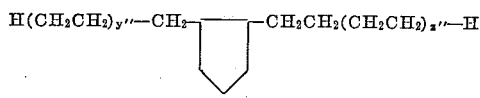

and the alkylcyclooctenes represented by the formula:

XVII

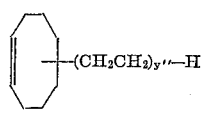

wherein y″ and z″ are as defined above.

The products thus obtained can be recovered from the reaction mixture in any convenient manner, as for instance, by distillation of the organic phase of the reaction mixture. Moreover, due to the nature of the polymers employed as precursors, the hydrolyzed product may comprise an isomeric mixture of 1,2-dialkylcyclopentanes of statistically varying molecular weight (alkyl chain length) in both trans and cis forms, the latter generally predominating in the product. In addition, cyclooctene and alkylcyclooctenes of statistically varying molecular weight are also produced. Such mixture can be resolved into components of narrow carbon content ranges by fractional distillation and the products analyzed by gas chromatography.

The dialkylcyclopentanes can also be obtained by the reaction with hydrogen of the di(ω-alkenyl)cyclopentanes of Formulas VI to VIII in accordance with conventional processes for the hydrogenation of olefinically unsaturated compounds, while alkylcyclooctanes are similarly obtained from the ω-alkenylcyclooctenes of Formula IX.

The invention, in its various aspects, can be illustrated further by the following examples.

*Example I*

In a one-liter flask equipped with a stirrer, thermometer, condenser, inlet tube and attachment to a dry ice trap, 132 grams of triisobutylaluminum were added with stirring to 216 grams of 1,5-cyclooctadiene, over a period of about three hours, at a temperature maintained in the range of from 122° C. to 149° C. Heating and stirring were then continued at a temperature of about 145° C. for an additional period of about one hour. During course of the ensuing reaction, 106 grams of isobutylene, formed as a by-product, were removed. Thereafter, 52 grams of unreacted cyclooctadiene were recovered by distillation without rectification at a temperature of 55° C. under reduced pressure. A polymeric product composed of recurring 1 - aluminomethyl - 2 - aluminoethylcyclopentane units was formed. The polymer was hydrolyzed by reaction with 300 milliliters of ethanol at a temperature of about 45° C. Hydrolysis was subsequently continued by reaction with dilute hydrochloric acid at the same temperature. A two-phase reaction mixture comprising an upper organic layer and a lower aqueous layer was formed. The organic layer was separated, combined with a petroleum ether (B.P. 35–37° C.) extract of the aqueous layer washed first with water, then with dilute sodium hydroxide, and thereafter again with water, dried over calcium chloride, and fractionally distilled. The fractions were analyzed by gas chromatography. There were thus obtained as products, 26.5 grams of trans-1-ethyl-2-methylcyclopentane, 41.3 grams of cis-1-ethyl-2-methylcyclopentane, and 16.4 grams of cyclooctene. In addition, minor amounts of $C_{16}$ hydrocarbons and an isomeric mixture of cyclooctadienes were also recovered.

*Example II*

In a manner similar to that described above in Example I, 264 grams of triisobutylaluminum were heated with 432 grams of 1,5-cyclooctadiene to produce 339 grams of a polymer composed of recurring 1-aluminomethyl-2-aluminoethylcyclopentane units. A mixture of 320 grams of this polymer, 500 ml. of benzene, and 0.15 gram of nickel acetylacetonate was charged to a stainless steel bomb under a nitrogen atmosphere. Thereafter, 351 grams of ethylene were added to the mixture, and the bomb was closed and heated, accompanied by rocking, to a temperature of 74° C. within a period of 15 minutes. The pressure within the bomb at this point was 1080 p.s.i. Heating was continued, accompanied by rocking, at a temperature maintained in the range of from 69° C. to 74° C. for a period of 17 hours, whereupon the pressure within the bomb had dropped to 680 p.s.i. at 70° C. The bomb was vented at room temperature and its contents transferred under a nitrogen atmosphere to a distillation flask. Benzene and other low-boiling material were removed by distillation without rectification by lowering the pressure gradually to 10 mm. of Hg at 40° C. The distillate was then fractionally distilled and the fractions analyzed by gas chromatography. In this manner, about 28 grams of a predominantly 1-methylene-2-vinylcyclopentane-containing fraction were recovered at 121° C./atmospheric pressure to 110° C./200 mm. of Hg. Another predominantly 1-methylene-2-vinylcyclopentane-containing fraction (B.P. 122–124° C.) had the following physical properties: $n_D^{30}$ 1.4572, $d_{20}^{20}$, 0.814.

*Analysis.*—Calculated for $C_8H_{12}$: C, 88.82; H, 11.18; M.W., 108. Found: C, 88.55; H, 11.39; M.W., 108.

Two milliliters of the 1-methylene-2-vinylcyclopentane product (B.P. 122–124° C.) were hydrogenated over platinum oxide in a Parr hydrogenator at 40 p.s.i. and room temperature for a period of about 1 hour. The pressure at the end of this period was 37.5 p.s.i. There were thus obtained as products trans- and cis-1-methyl-2-ethylcyclopentanes in an essentially quantitative yield as indicated by gas chromatography.

The 1-methylene-2-vinylcyclopentane product is subsequently converted to 1-methyleneoxy-2-(1,2-epoxyethyl)

cyclopentane by admixing the diene, in ethylacetate, with an excess over two moles of peracetic acid per mole of diene, and heating the resulting mixture at a temperature of about 60° C. for several hours.

*Example III*

In a manner similar to that described above in Example I, triisobutylaluminum is reacted with 1,5-cyclooctadiene to produce a polymer composed of recurring 1-aluminomethyl-2-aluminoethylcyclopentane units. A mixture of this polymer and benzene are charged to a stainless steel bomb under a nitrogen atmosphere. Thereafter, an amount of ethylene approximately equal to twice the weight of the polymer is added to the mixture, and the bomb is closed and heated, accompanied by rocking, at a temperature of about 85° C. for a period of about one day. An ethylenically "grown" polymer composed of a proportion of recurring di(aluminoalkyl)cyclopentane units substantially equal to the proportion of 1-aluminomethyl-2-aluminoethylcyclopentane units in the polymeric precursor is formed. The "grown" polymer is hydrolyzed by reaction with ethanol and dilute hydrochloric acid. A two-phase reaction mixture comprising an upper organic layer and a lower aqueous layer is formed. The organic layer is then separated, washed with water, dried over calcium chloride, and fractionally distilled, the fractions being analyzed by gas chromatography. In this manner, there are obtained as products 1,2-($C_3$-, $C_5$-, $C_7$-, $C_9$-, $C_{11}$-, $C_{13}$-, $C_{15}$-, and $C_{17}$-dialkyl)cyclopentanes, i.e. cyclopentanes containing two alkyl substituents possessing an aggregate sum of carbon atoms. A minor amount of similarly "grown" alkylcyclooctenes is also obtained.

*Example IV*

In a manner similar to that described above in Example III, an ethylenically "grown" polymer composed of recurring di(aluminoalkyl)cyclopentane units is produced by the initial reaction of triisobutylaluminum with 1,5-cyclooctadiene to form a polymer composed of recurring 1-aluminomethyl-2-aluminoethylcyclopentane units, followed by the reaction of the polymer with ethylene in the absence of catalyst. Thereafter, an additional amount of ethylene slightly less than that previously charged, together with a catalytic amount of nickel acetylacetonate, is added to the bomb containing the polymer and the bomb is closed and reheated, accompanied by rocking, at a temperature of about 90° C. for a period of about one day. The product is hydrolyzed by reaction with ethanol and dilute hydrochloric acid. A two-phase reaction mixture comprising an upper organic layer and a lower aqueous layer is formed. The organic layer is then separated, washed with water, dried over calcium chloride and fractionally distilled, the fractions being analyzed by gas chromatography. In this manner, there are obtained as products 1,2-($C_3$-, $C_5$-, $C_7$-, $C_9$-, $C_{11}$-, $C_{13}$-, $C_{15}$-, and $C_{17}$ - di - ω - alkenyl)cyclopentanes, i.e. cyclopentanes containing two ω-alkenyl substituents possessing an aggregate sum of 3, 5, 7, 9, 11, 13, 15 and 17 carbon atoms. A minor amount of similarly "grown" ω-alkenylcyclooctenes is also produced. The di(ω-alkenyl)cyclopentanes and ω-alkenylcyclooctenes are converted to the corresponding diepoxides by reaction with excess peracetic acid in a manner similar to that described above in Example II.

*Example V*

An ethylenically "grown" polymer, dissolved in benzene, is obtained as described above in Example IV. At a temperature of about 60° C., dry air is then passed through the reaction mixture, thereby oxygenating the polymer. Upon completion of the ensuing reaction, as evidenced by a cessation in the evolution of heat, water is added to the reaction mixture, accompanied by heating at a temperature of about 100° C. to hydrolyze the polymer. The precipitated aluminum hydroxide is removed by filtration. The filtrate is thereafter fractionally distilled. In this manner, there are obtained as products, 1,2($C_3$-, $C_5$-, $C_7$-, $C_9$-, $C_{11}$-, $C_{13}$-, $C_{15}$-, and $C_{17}$-di-ω-hydroxyalkyl)cyclopentanes, i.e. cyclopentanes containing two ω-hydroxyalkyl substituents possessing an aggregate sum of 3, 5, 7, 9, 11, 13, 15 and 17 carbon atoms. A minor amount of hydroxycyclooctene and similarly "grown" ω-hydroxyalkylcyclooctenes is also produced.

What is claimed is:

1. The process for the production of a polymer composed of recurring units of the formula:

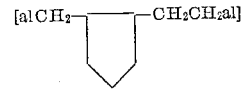

wherein al designates one-third of an atom of aluminum, which process comprises bringing 1,5-cyclooctadiene into reactive admixture with an isoalkylaluminum of the formula selected from the group

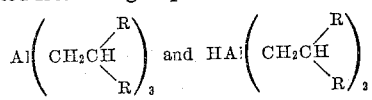

wherein each R, independently, designates an alkyl radical of from 1 to 4 carbon atoms, at a temperature of from about 80° C. to about 180° C., and for a period of time sufficient to produce said polymer.

2. The process for the production of a polymer composed of recurring units of the formula:

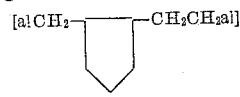

wherein al designates one-third of an atom of aluminum, which process comprises bringing 1,5-cyclooctadiene into reactive admixture with an isoalkylaluminum of the formula selected from the group

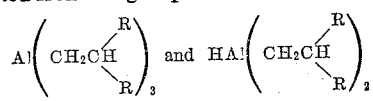

wherein each R, independently, designates an alkyl radical of from 1 to 4 carbon atoms, at a temperature of from about 120° C. to about 160° C., for a period of time sufficient to produce said polymer.

3. The process according to claim 2, wherein the isoalkylaluminum is triisobutylaluminum.

4. The process for the production of an ethylenically grown polymer composed of recurring units of the formula

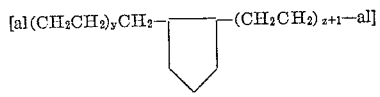

wherein al designates one-third of an atom of aluminum, and y and z designate integers of from 0 to 8, at least one of which is a positive integer, which process comprises the steps of (a) bringing 1,5-cyclooctadiene into reactive admixture with an isoalkylaluminum of the formula selected from the group:

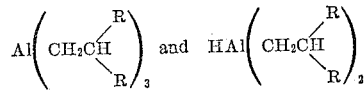

Wherein each R, independently, designates an alkyl radical of from 1 to 4 carbon atoms, at a temperature of from about 80° C. to about 180° C., for a period of time sufficient to produce a polymer composed of recurring units of the formula:

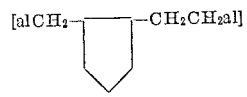

and (b) bringing said polymer into reactive admixture with at least 1.5 moles of ethylene per aluminum atom of said polymer, in the absence of a catalyst, at a temperature of from about 80° C. to about 190° C. for a period of time sufficient to produce said ethylenically grown polymer.

5. The process for the production of an ethylenically grown polymer composed of recurring units of the formula:

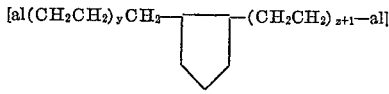

wherein al designates one-third of an atom of aluminum, and y and z designate integers of from 0 to 8, at least one of which is a positive integer, which process comprises the steps of (a) bringing 1,5-cyclooctadiene into reactive admixture with an isoalkylaluminum of the formula selected from the group:

$$Al\left(CH_2CH\diagdown{R \atop R}\right)_3 \text{ and } HAl\left(CH_2CH\diagdown{R \atop R}\right)_2$$

wherein each R, independently, designates an alkyl radical of from 1 to 4 carbon atoms, at a temperature of from about 120° C. to about 160° C., for a period of time sufficient to produce a polymer composed of recurring units of the formula:

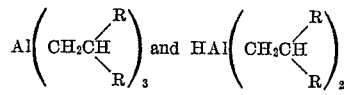

and (b) bringing said polymer into reactive admixture with at least 1.5 moles of ethylene per aluminum atom of said polymer in the absence of a catalyst, at a temperature of from about 85° C. to about 120° C., for a period of time sufficient to produce said ethylenically grown polymer.

6. The process according to claim 5, wherein the isoalkylaluminum is triisobutylaluminum.

7. The polymer composed of recurring units of the formula:

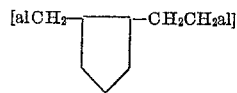

wherein al designates one-third of an atom of aluminum.

8. The ethylenically grown polymer composed of recurring units of the formula:

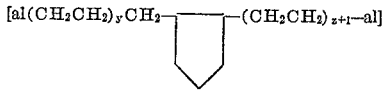

wherein al designates one-third of an atom of aluminum, and y and z designate integers of from 0 to 8, at least one of which is a positive integer.

References Cited

UNITED STATES PATENTS

| | | | |
|---|---|---|---|
| 2,457,328 | 12/1948 | Swern et al. | 260—348 |
| 2,485,964 | 10/1949 | Good et al. | 260—666 |
| 2,655,524 | 10/1953 | Sowa | 260—448 |
| 2,826,598 | 3/1958 | Ziegler et al. | 260—448 |
| 2,921,966 | 1/1960 | Carbon et al. | 260—617 |
| 2,936,324 | 5/1960 | Hasek et al. | 260—617 |
| 3,035,077 | 5/1962 | Johnson et al. | 260—448 |
| 3,036,136 | 5/1962 | Leigh | 260—666 |
| 3,078,280 | 2/1963 | Ploetz et al. | 260—348 |

TOBIAS E. LEVOW, *Primary Examiner.*

NICHOLAS S. RIZZO, *Examiner.*

J. P. FRIEDENSON, H. M. S. SNEED,
*Assistant Examiners.*